Jan. 30, 1962 T. SPARKS 3,018,949
REGISTER SELECTION CONTROL DEVICES
Filed May 10, 1957 8 Sheets-Sheet 1

FIG. 1

INVENTOR.
THOMAS SPARKS
BY Elmer W. Edwards

AGENT

FIG. 3

INVENTOR.
THOMAS SPARKS
BY Elmer W. Edwards
AGENT

Jan. 30, 1962  T. SPARKS  3,018,949
REGISTER SELECTION CONTROL DEVICES
Filed May 10, 1957  8 Sheets-Sheet 4

FIG. 4

INVENTOR.
THOMAS SPARKS
BY Elmer W. Edwards

AGENT

Jan. 30, 1962 T. SPARKS 3,018,949
REGISTER SELECTION CONTROL DEVICES
Filed May 10, 1957 8 Sheets-Sheet 5

INVENTOR.
THOMAS SPARKS
BY Elmer W. Edwards

AGENT

Jan. 30, 1962 T. SPARKS 3,018,949
REGISTER SELECTION CONTROL DEVICES
Filed May 10, 1957 8 Sheets-Sheet 6

INVENTOR.
THOMAS SPARKS
BY Elmer W. Edwards
AGENT

Jan. 30, 1962 T. SPARKS 3,018,949
REGISTER SELECTION CONTROL DEVICES
Filed May 10, 1957 8 Sheets-Sheet 7

INVENTOR.
THOMAS SPARKS
BY Elmer W. Edwards
AGENT

Jan. 30, 1962  T. SPARKS  3,018,949
REGISTER SELECTION CONTROL DEVICES
Filed May 10, 1957  8 Sheets-Sheet 8

INVENTOR.
THOMAS SPARKS
BY Elmer W. Edwards

AGENT

United States Patent Office 3,018,949
Patented Jan. 30, 1962

3,018,949
REGISTER SELECTION CONTROL DEVICES
Thomas Sparks, Orange, N.J., assignor to Monroe Calculating Machine Company, Orange, N.J., a corporation of Delaware
Filed May 10, 1957, Ser. No. 658,262
26 Claims. (Cl. 235—60)

The present invention relates to listing calculators of the type commonly referred to as duplex register machines, and more particularly to selection control devices for the registers thereof, whereby items as entered will be accumulated automatically upon alternate registers.

Duplex register machines in which the cyclic operating devices act to automatically shuttle the registers in and out of engagement alternately with their actuator members in cooperation with a shuttle movement of the usual record carriage are well known, one such being disclosed in U.S. Patent 1,929,625 issued October 10, 1933, to Loring P. Crosman. Said patent provides also for manual control means which disable the register engaging and disengaging mechanism in such manner that either register will remain in an active condition for repeated operations thereon while the record carriage remains in the related columnar position. Whenever a register change is to be effected relative to an initial entry, however, the devices of the above patent require that the operator must first make an idle machine operation so as to properly recondition the register engaging and disengaging mechanism. Also the devices of said patent make no provision for means which will always identify the particular register that is in an active condition for operation.

A control lever for manually adjusting duplex registers alternately into engagement with the differential actuator devices and a means which automatically controls a selective engagement of the registers through program control devices adjustable in accordance with a record carriage position are also set forth in U.S. Patent 2,147,692 issued February 21, 1939. Means for totalizing the registers is disclosed in U.S. Patent 2,261,341 dated November 4, 1941, and means for transferring a total from one register to the other is disclosed in U.S. Patent 2,070,785 dated February 16, 1937, all being granted to the same inventor, Loring P. Crosman.

An object of the present invention is to provide in such duplex register machines improved register engaging and disengaging mechanism which are operable by the machine cyclic devices independently of a record carriage control to effect entries alternately upon one and the other of two registers automatically.

As a further object the invention provides for a manual control of the register engaging and disengaging mechanism including means adjustable to alternate positions whereby either register may be selectively predetermined to be active for a first operation of the machine.

Another object of the invention is the provision of a manual control means which is selectively settable at any time for rendering the automatic engaging and disengaging mechanism for the registers active or inactive.

Another object of the invention is the provision of means automatically operable during a first operation of the cyclic devices in effecting an entry upon one register to effect an operation of the register engaging and disengaging mechanism and adjust thereby another register to active condition of operation independently of any setting of the said manual control means for the automatic register engaging and disengaging mechanism.

A still further object of the invention provides means which include a cyclic operation control key adapted for disabling the register engaging and disengaging mechanism, whereby repeated registrations are made in either selected register without requiring a manual adjustment of the shuttle control lever.

Still another object of the invention is the provision of manual control means for effecting totalizing operations from one of said registers and which include a means adapted for control by the register selection means to prevent such totalizing operations when the said register selection means is set for an opposite register selection.

Manual control means are provided also to effect a totalizing operation relative to a given register with the register selection control means set to either register control position.

Special means are also provided wherein an operation of the register engaging and disengaging mechanism will be held in abeyance for a series of preliminary cycles of machine operations, such as employed in effecting true negative totalizing operations, and is released near the completion of a final operation of said series of operations.

With these and incidental objects in view, the invention consists in certain novel features of construction and combination of parts, the essential elements of which are set forth in the appended claims, and a preferred embodiment of which is hereinafter described with reference to the drawings, in which:

The listing calculator to which the invention is applied is of the well-known type, such as disclosed in the earlier referred to Crosman Patents 1,929,625, 2,070,785, 2,261,- 341 and 2,147,692 and as modified in accordance with the disclosure of U.S. Patent 2,330,270 issued September 28, 1943, to the same inventor and U.S. Patent 2,645,- 417 issued July 14, 1953, to Howard M. Fleming.

In so far as it is expedient, the parts hereinafter described which correspond to like parts in the foregoing patents will be similarly numbered and reference is made to said patents for details of construction not completely described in the following specification.

As set forth in the reference patents, amounts set up on digit keys 215 (FIGS. 1, 2) for each denominational order are transferred, additively or subtractively, upon operation of plus key 114 or minus operating key 274, to a series of accumulator wheels 473 by means of a series of spring operated differential actuators 610 loosely mounted upon a transverse shaft 608. The forward arm of each differential actuator lever 610 is provided with segmental rack teeth, adapted to mesh with the pinions 472 of the series of accumulator wheels 473. Index bars 615 are pivotally connected with the upper arms of levers 610, these index bars being moved, upon counterclockwise rotation of the levers, into engagement with the stems of selectively depressed keys 215. Type bars 611 are pivotally connected to the rearward arms of levers 610, each type bar being provided with a longitudinally disposed series of type representing the digit 0 and 1 to 9.

The digit keys which have been depressed to represent a value are latched in position with the bottoms of their stems lying in the path of movement of the related stop lugs of the bars 615, allowing such bars to advance a distance proportional to the value of the key, upon operation of the machine. Depression of a digit key will also remove a column latch 214 from the path of movement of its selected stop bar 615, these latches preventing movement of a stop bar and lever 610 in any column in which no key is depressed.

As in well-known manner fully set forth in the patents of reference the racks 610 are held in their normal clockwise position against tension of their respective springs 683, by a stud 659 fast in said racks and having engagement with a series of dogs 617 pivotally mounted upon a transverse rod 618 supported within a rocker frame 616 loosely mounted on the shaft 608.

A rock shaft 301 is oscillated by means of an electric motor 100 connected through means of suitable gearing and clutch means 103—104 (FIG. 3) with a rock arm 316, fast with shaft 301, by means of a connecting rod 108, so that as a crank arm 105 is rotated by the motor the shaft 301 will be oscillated.

Rock shaft 301 is provided with cam means 318 (FIGS. 2, 2A) cooperable with a roller 616ᵃ for governing the movement of frame 616. As shaft 301 is rotated counterclockwise a cooperating surface of cam 318 falls away from roller 616ᵃ and will permit frame 616 under influence of spring 616' to be rocked counterclockwise, carrying the rod 618 and the dogs 617 therewith, and any of the levers 610 which have been released by the depression of digit keys 215 will be allowed to rotate under influence of their springs 683 until they are stopped by the lugs of bar 615 contacting with the stems of the depressed keys. Upon clockwise movement of shaft 301 the cam 318 engaging roller 616ᵃ will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 is effected upon depression of any of the motor keys, the stems of which are provided with a cam surface 40 (FIG. 3) acting upon depression of a key to move a slide 41 forwardly thereby operating a bell crank lever 42 raising roller 43 of said lever out of engagement with a suitable opening in a spring operated slide 44. Slide 44 is provided with a lug 45, which, upon depression of an operating key and subsequent forward operation of slide 44, engages the upper arm of a pivoted latch 112, thereby releasing said latch from clutch control lever 106, whereupon said lever will be moved counterclockwise by its spring 89, and an insulation roller 109 on said lever will act to close a switch 110 in the circuit of the electric motor. In this movement the lower end of lever 106 will be disengaged from the tail of the spring urged clutch pawl 103, and allow said pawl to fall into engagement with the driving clutch member 104 to effect a machine cycle of operation.

During a machine cycle of operation the wheels of the accumulator 473 (FIG. 2) are rotated subtractively upon the forward stroke or additively upon the return stroke of the actuators 610, there being an actuator lever 610 and an associated accumulator wheel for each order provided in the machine. The ends of shafts 403 for each of the registers are supported within suitable guide slots of left and right subframing 404 of the machine, so that the accumulator assemblies may be moved radially of the actuators to mesh and unmesh the pinions 472. The timed meshing and unmeshing of the accumulator gears 472 in accordance with the character of operations to be performed thereon is controlled by means of a cam collar 453—453' (FIG. 14) fast upon each of the ends of the respective accumulator shafts 403, said collars cooperating with related cam plate means 419, 421 in the manner as will now be described.

The cam plates 419 cooperating with the collars 453' of the lower accumulator are fast each upon the opposite ends of a transverse shaft 420 bearinged within the support frames 404 for the accumulator shafts 403. Each of the cam plates 419 has pin and slot connection 419' with the corresponding cam plate 421 related to the upper accumulator, plates 421 being pivotally supported at 422 to the respective left and right sub-frames. Cam plates 419, 421 are adapted to be rocked toward each other in an operation of shaft 420 by means as will now be described with reference to FIG. 3, and as more fully set forth in reference Patent 2,330,270.

Figure 3:
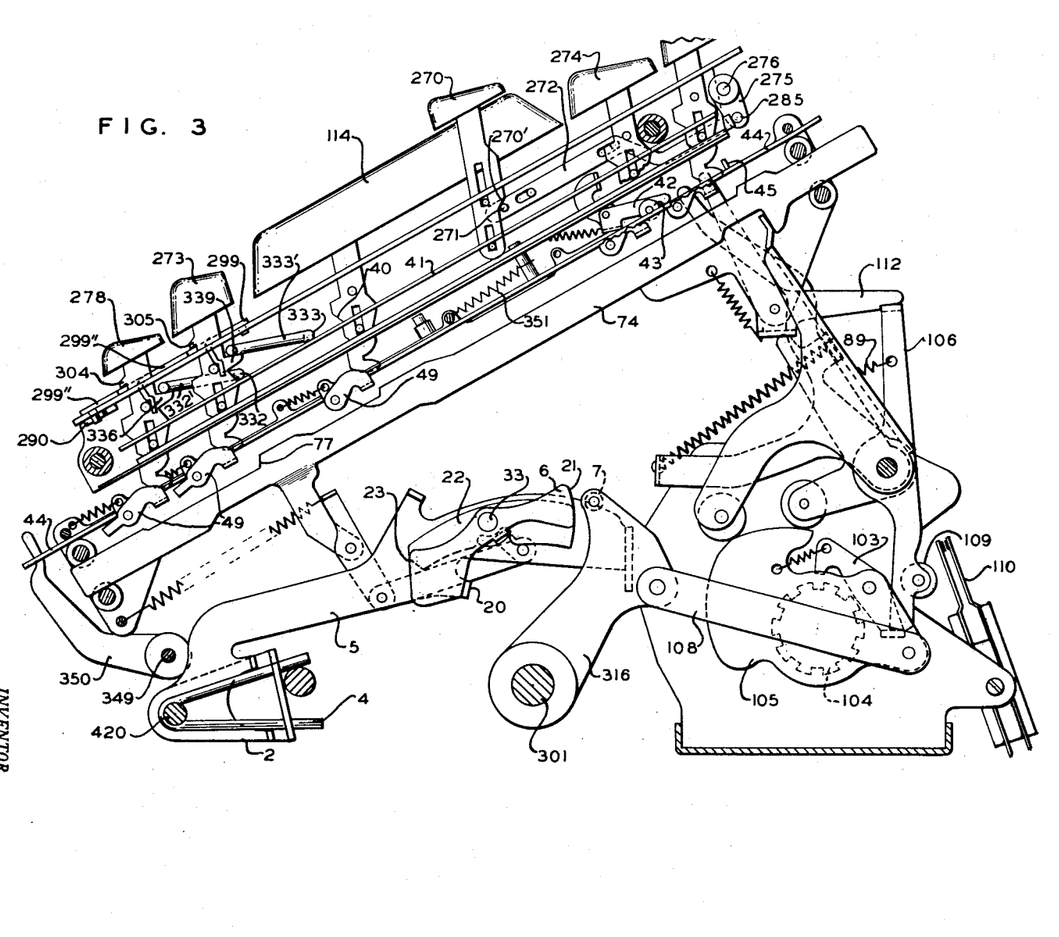
FIG. 3 is a right side elevation of parts immediately within the right side casing of the machine.

Fast upon shaft 420 is a plate 2, having yieldable spring connection 4 with an arm 5 provided with a lateral flange 22, and pivoted at 33 upon said arm is a switch 6, flange 22 and switch 6 lying in the plane of a roller 7 fixed upon rock arm 316. In additive operations roller 7 will contact with a cam surface 21 of switch 6 and thereafter with the rear end of flange 22, whereby arm 5 will be raised, thus rocking shaft 420 in a counterclockwise direction, such operation occurring prior to any movement of the actuator levers 610. During the forward movement of actuators 610, arm 5 will be held in raised position by engagement of roller 7 with the lower surface of flange 22. At the end of the forward stroke, roller 7 will lift the forward end of switch 6 away from a lug 20 of arm 5, and will thereafter move out of contact with the switch, which will return into normal relation with the arm. Upon the return stroke of the operating mechanism roller 7 will engage a cam surface 23 of switch 6, restoring arm 5 and the shaft 420 to their normal clockwise position prior to the return stroke of the actuators 610.

Figures 7, 15:
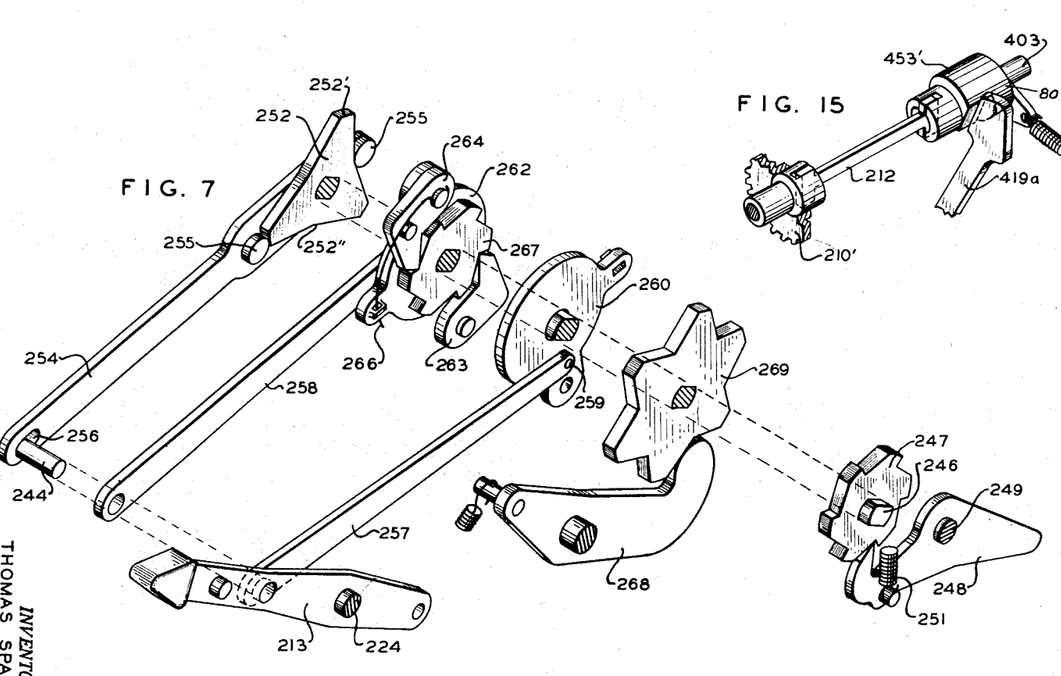
FIG. 7 is an exploded perspective view of register engaging and disengaging mechanism which automatically shuttle the register selection lever to alternate settings for controlling an alternate register selection.
FIG. 15 is a detail perspective of a universal joint drive which permits a displacement of the register shafts upon operation thereof by the register engaging and disengaging mechanism.
Figures 8, 9, 10, 11, 14:
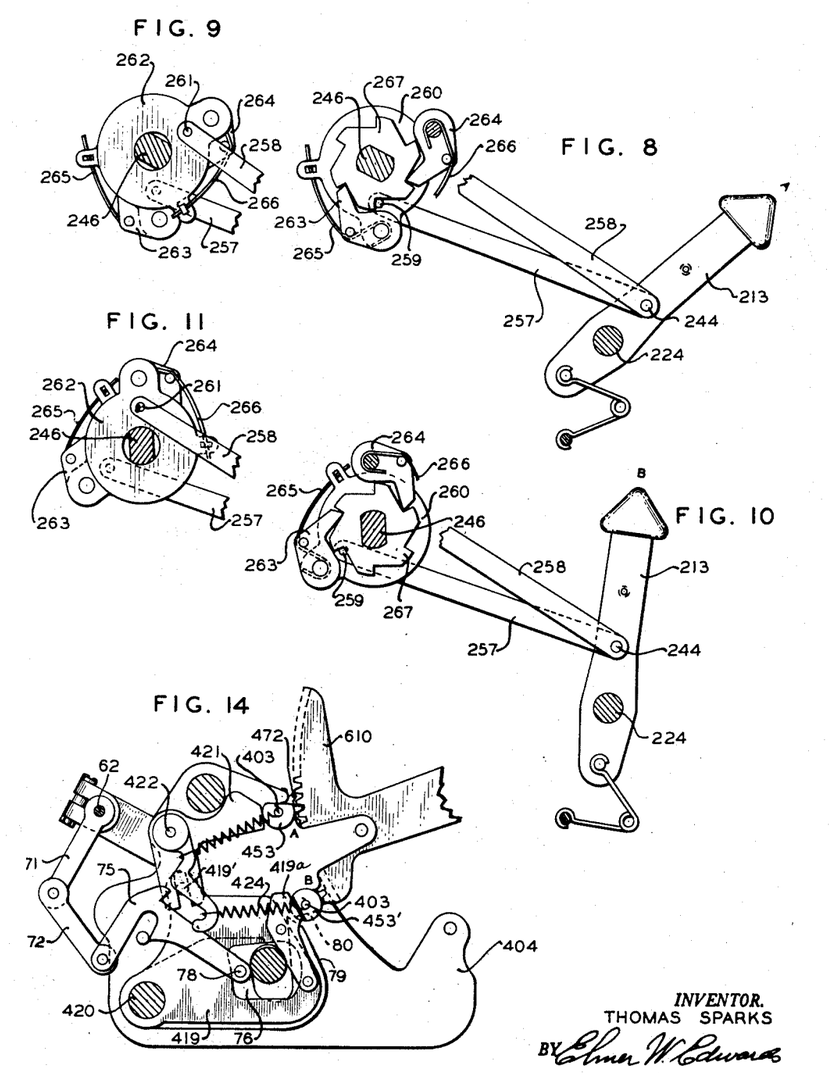
FIGS. 8 and 9 are detail left side elevations of certain parts related to the control lever for the registers, the lever being set in condition for the "A" register selection.
FIGS. 10 and 11 are similar detail views, the parts being shown with the control lever at "B" register selection position.
FIG. 14 is a detail right side elevation of certain cam devices operable in an operation of the shuttle devices to effect engagement of the accumulator wheels of one register with the actuator devices while disengaging the accumulator wheels of an alternate register therefrom.

In a normal position of the parts, as shown in FIG. 14, the cam plates 421 related to the upper accumulator have engagement with the peripheral diameter of the cam collar 453, whereby the upper accumulator is normally held in engagement with the actuator racks 610. The cam collars 453' (see also FIG. 15) on the lower accumulator shaft however presents a flattened portion thereof to related offset cams 419ᵃ fast to the cam plates 419, and said lower accumulator by spring means 424 is held normally out of engagement with the racks 610. For additive control of the cam plates 419, 421, above described, cams 421 rocking downward will release collar 453 so that the upper accumulator under influence of the related springs 424 is caused to be moved out of engagement with racks 610 prior to any movement of the racks by cam means 318 (FIG. 2), earlier described. Thereafter, as in the manner above described, cam plate 421 is restored to reengage the upper accumulator with racks 610, whereby said racks subsequently on their return stroke will effect additive operations thereto. During such operations the cam plates 419 will move the offset cams 419$^a$ idly relative to the lower accumulator collars 453' so that the lower accumulator will remain out of engagement with racks 610 for their entire operation. A selective adjustment of the switch member 6 (FIG. 3) for the purpose of controlling non-add, subtract and totalizing operations according to the forward displacement of a slide member 74 as permitted by the related operation control keys is also adapted to be effected, all as in the well-known manner disclosed in the above patents of reference.

*Control means for predetermining active register*

Figure 4:
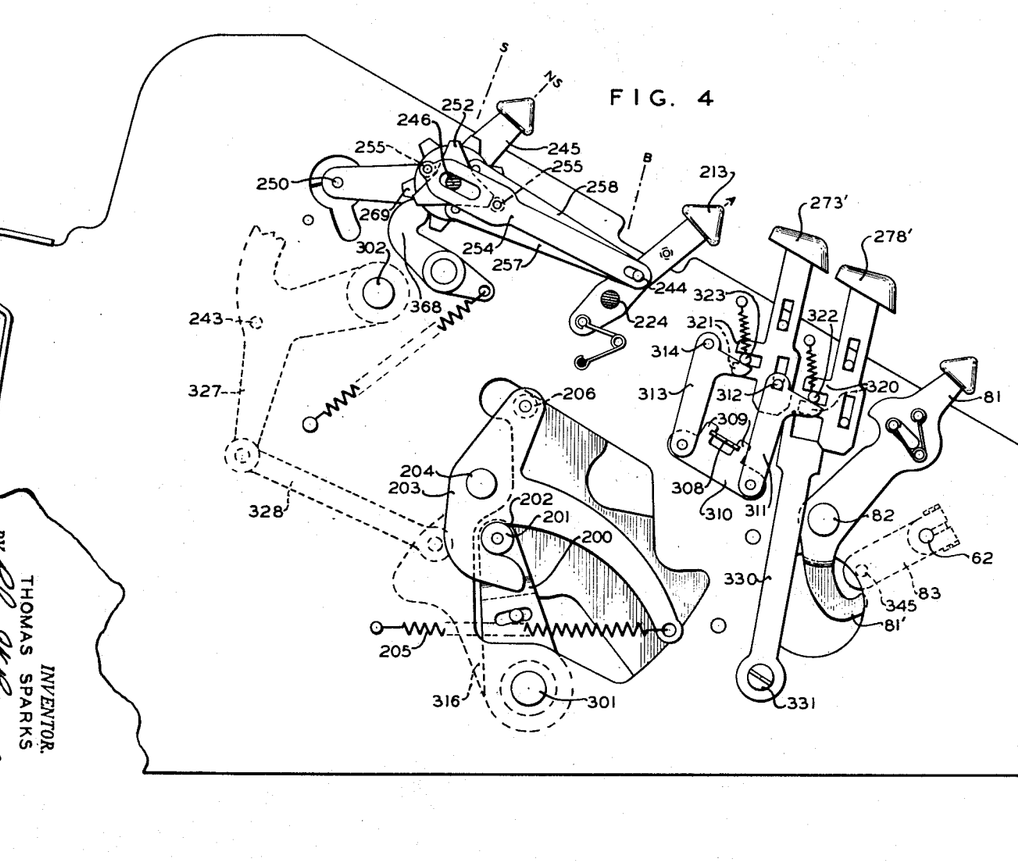
FIG. 4 is a left side elevation of the machine showing parts related to manually operable control means for the registers, and certain parts operable in an operation of the cyclic devices.

To effect operations within either register selectively a second means for controlling the collar cams 453, 453' of the register shafts 403 is provided herein. Said means is operable by the machine cyclic devices and includes manually settable control devices for selectively predetermining the operations thereof, in the manner as will now be described with reference to FIGS. 4, 5. Secured upon the left end of the rock shaft 301 operated by the machine cyclic devices, as earlier described, is an upwardly extending arm 200 having a roller 201 in engagement with a cam edge 202 formed on the under edge of one arm of a bell crank lever 203, loosely mounted upon a stub shaft 204, having suitable bearing support within the machine framing. In a forward movement of the rock shaft 301 roller 201 is carried forwardly by arm 200 and will immediately in a first portion of said movement impart a counterclockwise operation to the bell crank 203. Roller 201 thereafter moves idly along a dwell portion of cam edge 202 to maintain bell crank 203 in operated condition until near the end of the return stroke of the parts, when said roller thereupon permits bell crank 203 to be restored clockwise under influence of a suitable spring member 205. To an upwardly extending arm of the bell crank 203 is secured to a stud 206 which extends through a suitable aperture of the machine frame and is adapted during said operation of bell crank 203 for cooperation, as hereinafter described, with a latch member 207 (FIG. 5), pivoted at 208 upon a gear segment 209. Gear segment 209 is fast upon stub shaft 204 bearinged within the framing and has engagement with a pair of pinion gears 210, 210' bearinged for rotation upon suitable stub shafts 211, 211', both mounted within the left side framing. Pinions 210, 210' have each a universal joint connection 212 with the respective collars 453, 453' on the left end of the register shafts 403 earlier described. It will be recalled that said cams in the position illustrated in FIG. 14 provide for operations upon the upper register while the lower register is held out of engagement with the actuator racks 610. To selectively control operations relative to the upper and lower registers the latch member 207 is settable relative to cooperation with operating stud 206 by means of a manually settable control lever 213, pivoted at 224 to a suitable subframe (not shown) supported on the outer surface of the left side framing of the machine. To the upper portion of lever 213 is mounted a pin 225 having engagement with an open end slot formed in a plate 216 (FIGS. 5 and 12) slidably mounted, by means of slotted openings 218 formed therein, upon support studs 217 fast within the left side framing.

For controlling operations upon the upper accumulating register "A" lever 213 is set in the forward position (A), whereby slide 216 will be held forwardly. Upon the rearward edge of slide 216 is formed a cam surface 216' adapted for engagement with a roller 219 of a pawl 220, pivotally mounted at 208 upon the gear segments 209, said pawl having yieldable spring connection 221 with the latch member 207. In the forward position of slide plate 216 pawl 220 and latch 207 are held in a clockwise position by a spring member 222, whereby the hook end of latch 207 is held out of engagement with the operating stud 206, earlier described.

Figure 12:
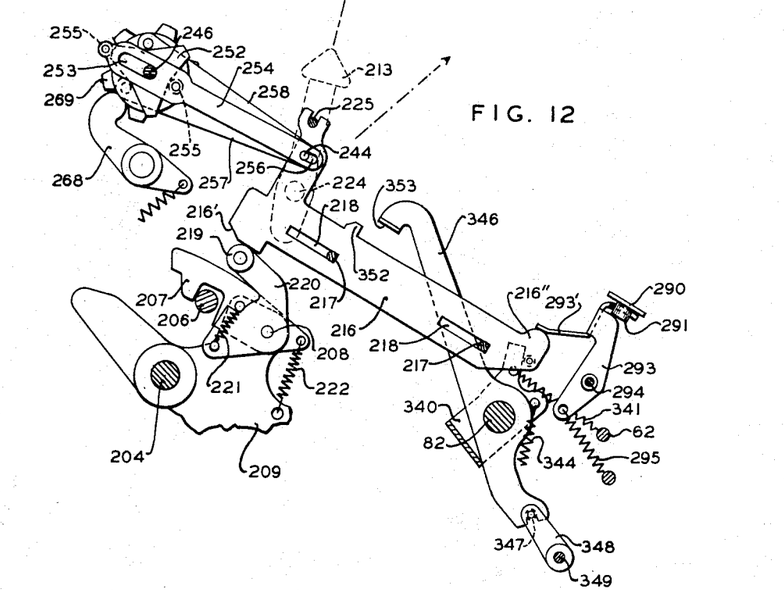
FIG. 12 is a left side elevation showing the register engaging and disengaging mechanism as conditioned for effecting an alternate register selection from the "A" to "B" register, following an operation of the cyclic devices relative to the "A" register.

For controlling operations in the lower register the lever 213 is adjusted manually to a rearward set position (B) shown in FIG. 12 and slide 216 is moved rearwardly therewith. During said movement cam edge 216' engages roller 219 and rocks pawl 220 and the latch 207 counterclockwise so that, the hooked end of said latch is now brought into engagement with the operating stud 206. Thereafter, upon any subsequent operation of the machine, stud 206 in a first movement of the cyclic devices effects a counterclockwise operation of gear segment 209 (FIG. 5) and will rotate the register shafts 403 clockwise (being counterclockwise, as viewed in FIG. 14). Thus prior to an operation of the actuator racks 610 a flattened portion on the cam roller 453 of the upper accumulator shaft is rotated opposite the cam plate 421 to disengage said accumulator from the racks 610. At the same time the plattened portion on the collar 453' of the lower accumulator shaft rotates away from cam member 419$^a$ while the maximal peripheral surface of said collar is rotated into engagement therewith and acts to cam the lower accumulator into engagement with the racks. Near the extreme end of the return stroke, after the rack arms 610 have completed their movement, operating stud 206 is restored by engagement of roller 201 (FIG. 4) with the cam portion of edge 202, as in the manner earlier described, and will rock segment 209 clockwise to restore the accumulators to the normal setting illustrated in FIG. 14. During the operation above-described special impulse means will act to automatically restore the lever 213 and associated parts from lower register control position (B) to the upper register control position (A), as in the manner hereinafter described.

Loosely mounted upon pivot stud 204 (FIG. 5) is a bell crank lever 226 biased for counterclockwise rotation by suitable spring means 230. Upon the lower arm of bell crank 226 is mounted a roller 227 having engagement with the peripheral edge of a cam lever 228 fast for operation with the rock shaft 301 in an operation of the cyclic operating devices. During the described rocking operation of shaft 301 by the cyclic devices, lever 228 will be reciprocated therewith and a cam notch 229, formed within the peripheral edge of said lever, will act near the extreme end of the return stroke of the operation to impart an oscillating movement to the bell crank lever 226, said movement being transmitted also to a bell crank lever 232 pivotally mounted to the framing at 233 and having pin and slot connection 231 with bell crank 226. Fast to the upper end of bell crank 232 is a pin 234, engaging a shouldered portion 235 formed by a slotted opening 236 in the rearward end of a slide 237. The forward end of said slide being supported by means of a slotted opening 238 therein engaging a stud 239 in the left side frame. To prevent an impulse operation of bell cranks 226 and 232 as notch 229 moves past roller 227 in a forward stroke of the lever 228 a latch member 240, fulcrumed at 241, is spring held so that a shoulder thereof is normally in a position for engaging a lug 242 of the bell crank 232. Near the end of a forward stroke of the cyclically driven parts a pin 243 on a lever 327, operated by shaft 302 having link connection 328 (FIG. 4) with rock arm 316, will act to release latch 240 (FIG. 5) from lug 242. This permits of a slight movement of the bell crank levers 232, 226, until roller 227 engages surface 229' of lever 229, said movement being sufficient to prevent the reengagement of latch 240 with lug 242, which otherwise would occur as pin 243 is moved away from said latch in the return stroke of lever 327. At the completion of a return stroke of the cyclically driven parts a high point of surface 229' will lift roller 227, whereby lug 242 is again raised into position of cooperation with latch 240. In the oscillation of bell cranks 226, 232 above described pin 234 of bell crank 232 effects a reciprocatory forward and return movement of the slide 237 and a pawl 137 pivoted on said slide will act during said forward movement to engage a pin 244 of control key 213, restoring said key, and the parts operated therewith, to the forward (A) set position, for thereafter controlling operations within the upper register.

Many classes of work performed upon duplex register machines of the type above-described require that registrations be made first upon one register and followed thereafter by a subsequent operation relative to the other register, in alternate manner. For such operations the present invention provides novel means for automatically adjusting control lever 213 to an alternate set position following each cyclic operation of the machine, whereby the registers are caused to be shuttled in and out of engagement with the actuator racks 610 in an alternate manner automatically. Manual means including a control lever 245 settable at any time for selectively predetermining an automatic shuttle or a non-shuttle operation of the above devices is also provided, all as hereinafter more fully to be described.

*Means for automatically effecting operations upon alternate registers*

Manual control lever 245 is adjacent and outside the left side framing and loosely mounted for pivoted movement upon a stub shaft 246, bearinged within said framing and a suitable sub-plate fast thereto. Shaft 246 extends within the framing and has fast upon the rightward end thereof a six tooth ratchet wheel 247 zoned in plane with an operating pawl 248 pivotally mounted at 249 upon the reciprocating slide 237 above described. Lever 245 is held in either forward non-shuttle control position or in a rearward shuttle control position by suitable toggle spring means 245', and it will be observed that a pin 250, securing one end of said spring to the lever 245, is adapted for engagement with the bottom edge 248' of pawl 248. With lever 245 in a forward set position pin 250 acts to hold pawl 248 free of engagement with said ratchet wheel. Upon a rearward setting of lever 245, however, pin 250 releases pawl 248 for engagement with ratchet wheel 247 under influence of a suitable spring 251, connected to said pawl and to a pin in slide 237. In an operation of slide 237 by the impulse means above-described therefore pawl 248 near the end of each operation of the machine with lever 245 in rearward set position will act to index ratchet wheel 247 one tooth step of movement. Operation of ratchet wheel 247 acts to index control means which are adapted to automatically shuttle the register selection control lever 213 to alternate set positions in the manner and purpose to be hereinafter describerd. It will be noted that in the above-described rearward setting of shuttle control lever 245 to the shuttle control position said lever acts to engage the end 138' of a lever 138, fulcrumed to the framing at 139, and will rock said lever for cooperation with a pin 140 to rock pawl 137 clockwise, whereby the above-described restoration of lever 213 by the forward impulse movement of slide 237 is disabled.

Referring now to FIGS. 7-12 of the drawings, fast to the stub shaft 246 for rotation with ratchet wheel 247 is a cam member 252 having three equally spaced raised areas 252' and three depressed areas 252'', each one of said depressed areas being opposed to a related one of the said raised areas. Control lever 213 is provided with a pin 244 upon which is mounted, through means of slot 256, the forward end of a slide member 254. The rearward end of slide 254 is provided with a slotted opening 253 (FIG. 12) for slidable support upon the shaft 246. Mounted upon slide 254 is a pair of rollers 255 spaced one for engagement with a raised area 252' of cam 252 when the other is in engagement with the opposed depressed area 252'' thereof. During an indexing operation of cam 252 above-described therefore said cam is adapted to alternatively exert pressure upon the forward or rearward of the rollers 255 of lever 254 selectively as determined according to the initial setting of the control lever 213 and will at the completion of each machine operation act to automatically adjust lever 213 and the parts controlled thereby, including clutch pawl 207, to the opposite register control position.

Thereafter automatic adjustment of lever 213 in the succeeding machine operations will set clutch pawl 207 alternately for engagement and non-engagement with operating stud 206, so that segment 209, operating in each alternate machine operation, will effect a shuttle operation of the registers, whereby alternate items in a series of successive entries are automatically recorded each within the related one of said registers.

So that the manual operations of lever 213 earlier described may be effected without conflict with the automatic cam means 252 (FIG. 7) above-described the following special means are provided for effecting an operation of shaft 246 and cam 252 in conjunction with any operations of lever 213 toward either of its said control positions.

Pivotally mounted at their forward ends upon the pin 244 is a pair of connecting links 257, 258, the link 257 having pivotal connection 259 with the lower part of a disc 260, loosely mounted upon stub shaft 246, while link 258 has pivotal connection 261 to the upper part of a similar disc 262 also loosely supported on said shaft. Link 257 is thus connected to the disc 260 at a point below the pivot shaft 246 while link 258 is connected to disc 262 at a point above said shaft 246. Thus it will be apparent that in any adjustment of control lever 213, in either direction, the discs 260 and 262 are rotated each oppositely to the other. Plates 260, 262 each has pivotally mounted thereon a pawl 263, 264 respectively, each pawl being held by related spring means 265, 266 into engagement with a six tooth ratchet wheel 267 in common to both said pawls and being fast for rotation with the shaft 246. Upon a rearward movement of control lever 213 therefore, pawl 263 will index the ratchet wheel 267 and shaft 246 one-sixth step of rotation in counterclockwise direction, as viewed in FIG. 7 (clockwise as view in FIG. 5), during which movement pawl 264 moves reversely for engaging a subsequent tooth of the ratchet wheel. In similar manner a forward movement of lever 213, acting through pawl 264, acts also to index ratchet wheel 267 for rotating shaft 246 in the same direction, while the pawl 263 moves idly in the reverse direction to engage the next tooth of the wheel.

In the above-described manual operation of shaft 246 cam 252 is rotated idly in synchronism with the movement of levers 213, 254, and the pin 244 of lever 213 moves idly in slot 256 of lever 254 during a first part of the indexing movement for cam 252. Thus an active surface 252' of said cam adjacent either of the rollers 255 will be displaced in time to permit slide 254 and lever 213, together with parts associated therewith, to complete a full extent of their movement. In the event the automatic shuttle lever 245 is in rearward shuttle control position during the above-described operation, ratchet wheel 247 will merely rotate idly over the actively set pawl 248. For the automatic operations of shaft 246 by pawl 248 a slight clearance is required between the spaced rollers 255 and the related surface of cam 252, which permits said cam to displace surface 252'' thereof free of engagement of roller 255, following which said cam will immediately effect operation of both lever 254 and the lever 213.

The yieldable pawl 220 earlier described will permit an adjustment of lever 213 from A to B register control position and set pawl 207 while the operating stud 206 is in process of moving into engagement with the said pawl during a return movement of said stud.

From the above description of the parts it will be obvious therefore that the control lever 213 is settable in either direction with the automatic shuttle conrol lever 245 set to either a forward or a rearward position. Also, said lever 245 is manually adjustable at any time for selectively predetermining an automatic operation of the index devices for the shuttle control, whereby following an entry in one register a subsequent entry will automatically be caused to enter an alternate register.

To maintain shaft 246 and the parts associated therewith in any indexed position a suitable spring locator pawl 268 (FIG. 7) is provided, engageable with a six-tooth locator wheel 269 fast upon the shaft 246.

*Special means for effecting repeat operations upon either register*

Figure 1:
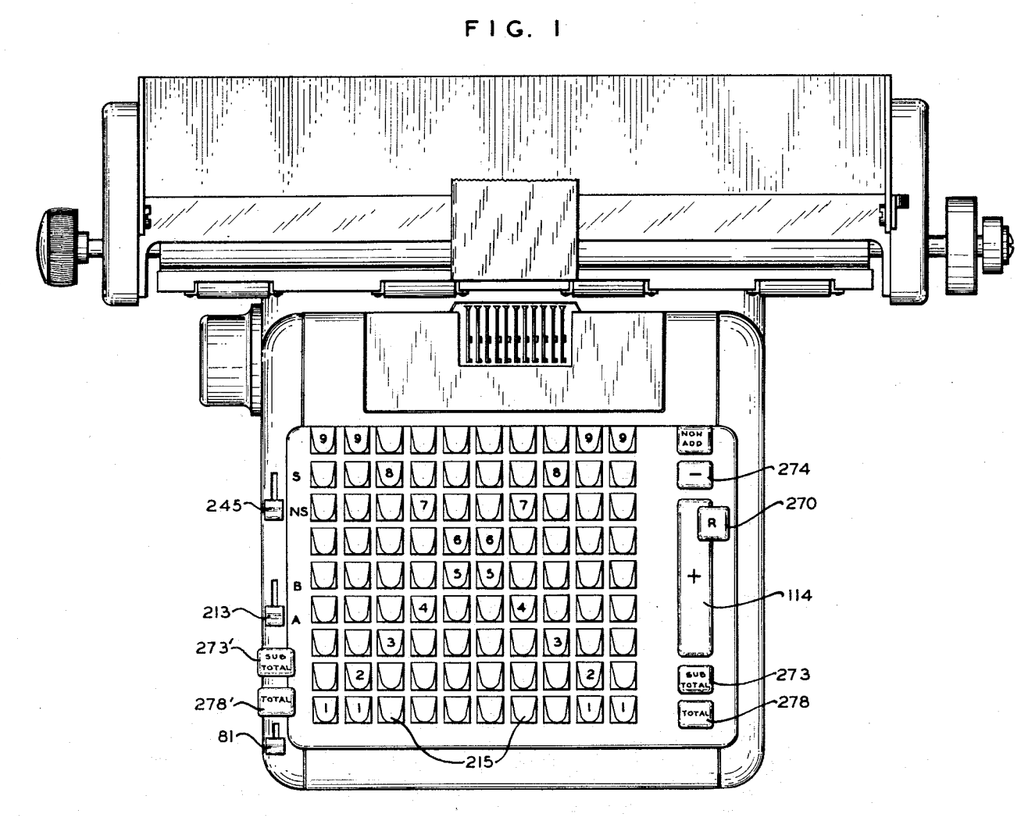
FIG. 1 is a diagrammatic plan view of a listing calculator embodying the invention.
Figures 2, 2A:
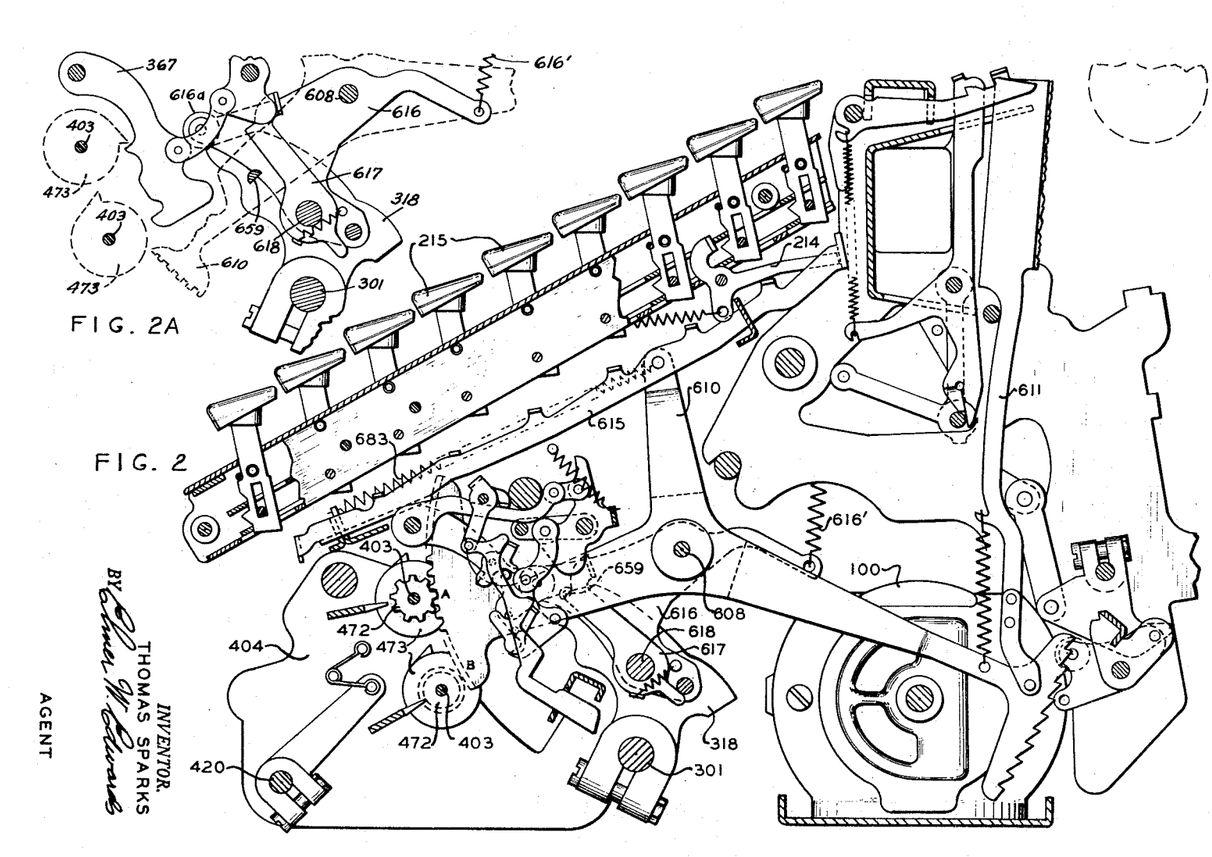
FIG. 2 is a vertical section through the keyboard, accumulator and printing mechanism.
FIG. 2A is a detailed view showing in operated position certain of the parts of FIG. 2.
Figure 13:
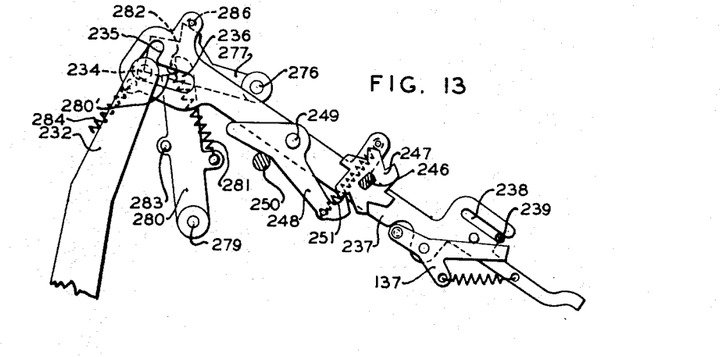
FIG. 13 is a detail left side elevation showing a means adapted for disabling the automatic shuttle devices upon the operation of a special machine operating control key.

As above set forth, with lever 245 in its rearward shuttle control position a reciprocation of slide 237 at the end of each machine cycle of operation acts through the index means to adjust the control lever 213 automatically to an alternate register control position. Also, it is recalled that slide 237 acts through pawl 137 to restore control lever 213 from the rearward (B) register selection position to the forward (A) register selection position in the forward non-shuttle setting of control lever 245. So that repeat operations may be made upon either register without altering the setting of control levers 245, 213, special machine operating control means are provided which act to disable operations of slide 237, as in the following manner. With reference to FIGS. 1 and 3, overlapping the plus operating key 114 is a repeat operation key 270 provided with a cam portion 270' on the stem thereof, said cam 270' having engagement with a pin 271 in the forward end of a slide member 272. The rearward edge of slide 272 engages a pin 285 fast to a depending arm 275 secured upon a rod 276 extending transversely of the machine. Upon the left end of rod 276 is secured a rearwardly extending arm 277 (FIG. 5) an upper edge of which is positioned beneath a pin 286 within the slide member 237. Upon depression of key 270 (FIG. 3) therefore plus bar 114 is also depressed and will start a machine cycle of operation, as in the manner earlier described. During depression of key 270 cam edge 270' engages pin 271 and moves slide 272 rearwardly into engagement with pin 285, rocking arm 275 and shaft 276 in a counterclockwise direction as viewed in FIG. 3, said movement of shaft 276 being clockwise as viewed in FIG. 5. Upon said operation of shaft 276 arm 277 engaging pin 286 will lift the rearward end of slide member 237 to the position as illustrated in FIG. 13, wherein shoulder 235 of said slide is now out of engagement with pin 234 of the operating bell crank 232 for slide 237. Thus the earlier-described reciprocatory movement of bell crank 232 by lever 228 near the end of the cycle is now ineffective of operating the slide member 237, whereby index pawl 248 for shaft 246 and cam 252 at this time remains inactive and no adjustment of the control lever 213 is effected by said cam. Also, pawl 137 of slide 237 will be inactive of engagement with pin 244 of the lever 213, so that said lever following the machine operation will remain in the original position as set. In order that the control key 270 (FIG. 3) may be released immediately by the operator the following latch means provides for holding the parts in adjusted position until released automatically near the end of the cycle of operation.

Pivotally mounted at 279 (FIG. 5) to the framing is an upwardly extending latch arm 280, being biased rearwardly by spring means 281 against a pin 282 in arm 277. Upon upward movement of arm 277, in the operation of key 270, a shoulder 280' of latch 280 is brought into engagement with pin 282 and will hold latch 277 and slide 237 in raised position. Near the end of a machine cycle bell crank 232, in its clockwise forward movement, engages a pin 283 of latch 280 and will rock said latch clockwise, thereby releasing shoulder 280' from pin 282 of lever 277 and permitting slide 237 to fall slightly and rest upon pin 234 of the operated bell crank 232. At the end of the return stroke of bell crank 232 pin 234 releases the rearward end of slide 237 for downward movement by its spring 284, and the parts again are now at normal restored position.

*Control devices for totalizing the registers selectively*

As is usual in machines of this type, totals are printed by first disengaging the actuators 610 (FIG. 2) from their column latches 214, and from the frame 616 by thereafter successively tripping the dogs 617 and allowing the actuators to move subtractively under influence of their springs 683, to rotate the accumulator wheels to zero, in which position the wheels are held by engagement with appropriate stops 367 successively displaced for cooperation therewith during the tripping operation of the dogs 617, after which the cycling of the machine will effect normal operation of the printing means at the end of the forward stroke of the operating means, whereafter frame 616 will pick up and return the actuators to normal position all as in the manner set forth in the U.S. Patent 2,261,341 to which reference is made for details of structure and operation not deemed to be pertinent to the present disclosure.

These and other special functions are effected under control of the slide 74 (FIG. 3) and of other spring slides lying beneath suitable bails 49 settable by the related operating keys for controlling forward movement of the slides, in the manner and purpose as fully set forth in U.S. Patent 2,330,270 of reference.

The total, sub-total keys 278, 273 provided on the right of the machine are adapted for effecting totalizing operations relative to the upper register (A). Special total, sub-total keys 278', 273' (FIGS. 1, 4) are provided on the left side of the machine for effecting totalizing operations relative to the lower register (B), as hereinafter to be described. A depression of total key 278 (FIG. 3) for the upper register (A) will release slide 44 and start motor operation, as in the manner previously described for the other operating control keys, and it will also allow a full movement of slide 74 to provide for a subtractive operation; that is to say, the accumulator pinions 403 of the upper register will be left in mesh during the zeroizing operation, and will be unmeshed before the additive stroke of the actuators 610 is effected. The sub-total key 273 operates precisely in the manner of total key 278, except that slide 74 is held in its partially operated position by engagement of the related bail 49 with a shoulder 77 of the slide. Thus switch 6 is held in the same position as that assumed in non-add operations, whereby the total subtracted from the accumulator wheels is restored thereto during the return stroke of the operating mechanism.

Figures 5, 6:
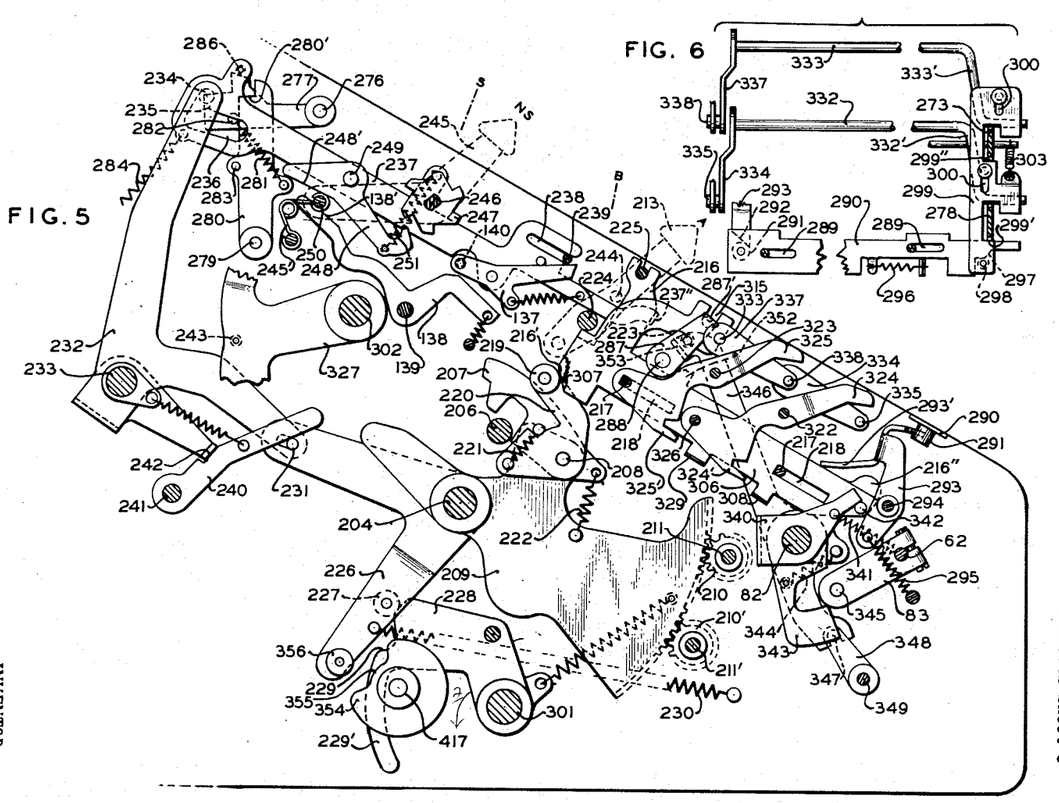
FIG. 5 is a left side vertical section taken immediately within the left side casing of the machine, showing manually settable control devices as set for a non-shuttle control operation, and the register selection control lever in upper register "A" control setting.
FIG. 6 is a detail plan view of interlocking means which prevent totalizing from one register when the register control means is in an opposite register control setting.

To prevent inadvertently totalizing the lower register (B) by an operation of the total or sub-total keys 278, 273 when register control key 213 (FIG. 5) is in the rearward (B) register control position the following interlock control devices are provided. To the underside of the keyboard, near the forward end, is slidably mounted by pin and slot means 289 (FIG. 6) a transverse slide 290 provided with a roller 291 having engagement with a forward cam edge 292 of a rocker 293 (FIG. 5) fulcrumed at 294 upon the left side framing. Rocker 293 is biased counterclockwise by spring means 295 and is provided with a rearwardly extending lug 293' adapted for engagement by a cam projection 216" of the slide plate 216 settable by control lever 213, in the manner earlier described. In the (A) register selection position of lever 213 slide 216 and projection 216" are held forwardly, whereby said projection will be out of engagement with lug 293' and slide 290 is held rightwardly under influence of a suitable spring 296, as shown in FIG. 6. The rightward end of slide 290 is provided with a cam shoulder 297 engaging a roller 298 of a longitudinally movable slide 299 mounted upon the keyboard plate by pin and slot means 300. Slide 299 is biased rearwardly by spring means 303, and in the above-described position of the parts cam shoulder 297 engaging roller 298 will act to hold slide 299 forwardly against the tension of spring 303. In said forward position of slide 299 suitable shoulders 299' and 299" thereof are held out of the path of movement of projections 304 and 305 (FIG. 3) formed on the stems of the total and sub-total keys 278, 273 respectively, whereby said keys are free to be depressed whenever lever 213 is in the forward or (A) register control position.

When lever 213 (FIG. 12) is adjusted to rearward or (B) register control position, however, projection 216" engages lug 293' and will move rocker 293 clockwise, whereby cam edge 292 (FIG. 6) thereof will move slide 290 leftward. Leftward movement of slide 290 releases roller 298 permitting spring 303 to move slide 299 rearwardly, so that shoulders 299' and 299" are now moved beneath projections 304 and 305 and will thereby lock the total and sub-total keys 278, 273 in raised position. For selectively controlling totalizing operations relative to the (B) register special total, sub-total keys 278', 273' (FIG. 4) are provided, being positioned on the opposite side of the keyboard to the keys 278, 273 and adapted to effect operations as follows.

As shown in FIG. 5, there is also slidably mounted upon support studs 217 of slide 216 a slide plate 306 provided with a cam edge 307 cooperable with the roller 219 for adjusting the register selection control pawl 207, as in the manner and purpose earlier set forth in the description relative to the slide plate 216. Slide 306 has a laterally extending projection 308 embraced by a pair of spaced projections 309 (FIG. 4) extending upwardly from a link member 310. Link 310 has pivotal connection at the forward end thereof with a bell crank lever 311 pivoted to the framing at 312. The rearward end of link 310 has pivotal connection with a second bell crank lever 313, pivotally mounted to the framing at 314. The stems for each of the keys 278', 273' are provided with a pair of rearwardly extending projections 320, 321 respectively, each pair embracing a related pin 322, 323 fast within corresponding bell crank levers 324, 325 (FIG. 5). Bell crank 324 is pivotally mounted to the framing at 326, while bell crank 325 is fulcrumed upon the rearward support stud 217 for slides 216, 306. It will be apparent therefore that upon depression of either total key 278' or sub-total key 273' bell cranks 311 and 313 are rocked clockwise and will move the link 310 and, through means of lug 308, the slide 306 rearwardly. Upon rearward movement of slide 306 the cam edge 307 thereof engaging roller 219 rocks latch 207 into engagement with the operating stud 206, thereby subsequently effecting selection of the lower register (B), as in the manner heretofore described. Slide 306 is provided also with a second lateral lug 329 and upon any selective operation of total key 278' or sub-total key 273' the active bell crank 324 or 325, being rocked clockwise, will act to bring a tooth 324', 325' respectively thereof below the rearwardly moving of the related projections 308, 329 for the active bell crank and above said projections for the inactive bell crank, thereby locking the active key in depressed position and the inactive key against operation. An upwardly extending lever 330 (FIG. 4) pivoted to the framing at 331 cooperates with suitable cam edges on the lower ends of the keys 278', 273' to prevent simultaneous operation of said keys, in the usual manner.

The same means heretofore described with respect to effecting total and sub-total operations of the upper register (A) are utilized also in effecting the corresponding operations with respect to the lower register (B) and the following means are provided therefore to effect a depression of total key 278 when key 278' is depressed and for depressing sub-total key 273 when key 273' is depressed. Bearinged within suitable sub-framing of the keyboard devices are transverse rods 332, 333 (FIG. 6) the rod 332 having a forwardly extending arm 334 fast upon the left end thereof and being provided with a stud 335 underlying the upper arm of bell crank 324 (FIG. 5). The right-hand end of rod 332 is formed as a crank arm 332' (FIG. 3) extending forwardly and above a rearward projection 336 of the total key 278. Similarly rod 333 has a forwardly extending arm 337 (FIG. 5) provided with a stud 338 underlying the upper arm of bell crank 325 and the right-hand end of said rod, being formed as a crank arm 333' overlies the projection 339 formed on the sub-total key 273. Thus depression of total key 278' will act to depress total key 278 while depression of sub-total key 273' will act to depress sub-total key 273, thereby effecting a tripping of the totalizing devices, operation of the cyclic means and adjustment of the register control devices, all as in the manner described with relation to register (A) and as more fully set forth in the patents of reference. Near the end of said operation of the cyclic means the reciprocation of slide 237, earlier described, will act to bring a forward projection 237" thereof into engagement with a pin 223 to impart forward rocking movement to a lever 287 pivoted to the framing at 288. The upper end of lever 287 has a laterally bent lug 287' engaging an open end slot 315 of the slide 306, and during the above-described movement thereof will restore slide 306 to forward position. Upon forward movement of slide 306 projections 308, 329, are released from cooperation with the respective teeth 324', 325' of the bell cranks 324, 325, whereby the active one of said bell cranks and the total or sub-total keys 278', 273' and the keys 278, 273 associated therewith, are released to be restored to normal raised position by their usual related spring means.

Totals are adapted to be transferred from the upper accumulator (A) to the lower accumulator (B) according to the adjustment of a transversely extending control shaft 62 (FIG. 14), said shaft being operable through suitable devices under control of the total key 278, such as fully disclosed in U.S. Patent 2,070,785 and other patents to which reference is made heretofore. Shaft 62 has fast thereon an arm 71 having pivoted thereto a link 72 providing toggle connection with a hook 75 pivoted at 78 to a cam plate 76 loosely mounted upon shaft 420. Upon a clockwise adjustment of shaft 62, as viewed in FIG. 14, arm 71 through link 72 will raise hook 75 into latching engagement with the pin 419' of the cam plate 419, so that plates 76 and 419 are rigidly connected for operation in unison. It has been explained heretofore that during a total printing cycle of operation, cam plate 419 will remain inactive during a forward counterclockwise stroke of the actuator frame 616 (FIG. 2) and that before the return movement of this frame with the segment 610, plate 419 will be rocked upwardly. When hook 75 is engaged with pin 419' this upward movement of plate 419 will raise the cam plate 76 therewith, bringing a cam portion 79 thereof into engagement with a collar 80 fixed upon the shaft 403 of the lower accumulator (B), forcing said accumulator into meshing engagement with the segments 610. The return of the segments to normal position will, therefore, add the amounts taken from the upper accumulator (A) and set in the type bars 611, into the lower accumulator (B). The return movement of cam plate 419 near the end of the cycle of operation, and restoration of total key 278 and shaft 62 will allow plate 76 to return to the position illustrated in FIG. 14, under the influence of suitable springs (not shown).

For effecting a non-transfer total operation by total key 278 a manually settable lever 81 (FIG. 4) fulcrumed to the left side frame at 82, is provided with a projection 81' adapted in a rearward adjustment of lever 81 to engage with an arm 83 fast to the shaft 62 and thereby lock said shaft against the above-described operation. In the present machine, totals are to be transferred only from the upper accumulator (A) to the lower accumulator (B). Therefore, means as hereinafter described are provided to automatically disable operation of the transfer total control shaft 62 during a depression of total key 278 by the described operation of the total key 278' in totalizing the (B) register. Fulcrumed upon transverse rod 82 (FIG. 5) within the machine framing is a bail 340 biased in a clockwise direction by suitable spring means 341 against a pin 342 fast to the forward end of the slide 306. Also, loosely mounted upon rod 82 is a latch arm 343, having yieldable spring connection 344 with bail 340. During the rearward movement of slide 306 by depression of the total or sub-total keys 278', 273' pin 342 imparts a counterclockwise movement to the bail 340 and to latch member 343, whereupon said latch engaging a pin 345 within the arm 83 fast to the shaft 62, will lock said arm and shaft 62 against clockwise operation, thus disabling the transfer total devices earlier described.

Suitable interlock means for disabling an operation of the slide plate 216 and 306 and thereby preventing operation of the totalizing keys 278', 273' and of the register selection control lever 213 while the machine is cycling, are also provided, as follows.

Fulcrumed upon the transverse rod 82 (FIG. 5) is a lever 346 the lower end of which has open end slot connection with a pin 347 secured to an arm 348 fast to a transverse shaft 349. Secured upon shaft 349 near the rightward end thereof is an upwardly extending lever 350 (FIG. 3) having engagement with the forward end of the cyclic clutch release slide 44 through means of a suitable aperture in said slide. Upon a release of slide 44 to start cyclic operations, as in the manner previously described, said slide moving forwardly by spring means 351 will impart a counterclockwise operation to shaft 349, as viewed in FIG. 3 (clockwise as viewed in FIG. 5). Upon the upper edge of each of the slides 216, 306 is formed a tooth 352, and during the above-described operation of shaft 349 arm 348 imparts counterclockwise operation to lever 346 so that a lug 353 of said lever is carried downwardly therewith. Downward movement of lug 353 will position said lug rearwardly or forwardly of the respective teeth 352 of the slides 216 and 306, whereby said slides may be locked in either their forward or rearward set positions. Near the end of a cycle of operation slide 44 is restored by the means earlier described with reference to FIG. 3, and will restore the above-mentioned parts, whereby lug 353 is again lifted free of the tooth 352 of each of the slides 216 and 306.

It may be that totals appearing upon the accumulator wheels as a complemental amount are to be printed or transferred as a true negative value, and one manner of accomplishing this requires a plurality of consecutive cycles of machine operation, such as fully disclosed in U.S. Patent 2,645,417, to which reference is made for details of structure and operation not herein described. It is sufficient to the present disclosure to say that the transverse control shaft 417 (FIG. 5) of the instant case corresponds to the similarly numbered shaft of said patent and that said shaft is adapted to be indexed clockwise one-quarter turn during the return stroke of each of two preliminary control cycles of machine operation and a quarter turn on both the forward and return strokes of a final third cycle of operation.

In the above type of operations which involve a series of control cycles of machine operations the slide 237 (FIG. 5) and the means associated therewith for adjusting the control lever 213 to effect the automatic shuttle operations of the registers earlier described, will be operable only in a final cycle of the series of cyclic operations. The following means therefore is provided for disabling the automatic shuttle devices during the preliminary of said series of cyclic operations of the machine.

As shown in FIG. 5, there is secured upon the left end portion of control shaft 417 a control disc 354 provided with a cutaway portion 355 normally adjacent a roller 356 fast upon the lower arm of the bell crank lever 226, earlier described. It will be recalled that cam lever 228 engaging roller 227 of bell crank 226 effects an impulse operation of said bell crank near the extreme end of a machine cycle of operation. As set forth in the above-mentioned patent, for negative totalizing operations during the first portion of the return stroke of a first machine cycle of control operations, shaft 417 will be indexed a quarter turn. The outer peripheral diameter portion of disc 354 is thus brought opposite roller 356 and will act to prevent operation of lever 226 until early in the return stroke of the final machine cycle of operation, when the cutaway portion at such time will again be rotated opposite roller 356. Near the end of the final cycle roller 227 of bell crank 226 is now free for engagement with notch 229 of lever 228 and will effect an operation of slide 237 and the parts associated therewith, as in the manner and purpose heretofore described.

While the form of mechanism herein shown and described is admirably adapted to fulfill the objects primarily stated, it will be understood that various omissions, substitutions and changes in the form and details of the device illustrated, and in its operation, may be made by those skilled in the art without departing from the spirit of the invention. It is the intention, therefore, to be limited only as indicated by the scope of the following claims.

What is claimed is:

1. In a listing calculator, the combination with support frames, register means including a plurality of shafts mounted in said frames each shaft having accumulator wheels mounted thereon, cyclic operating devices, actuator means for said register means operable by said cyclic devices for effecting and recording a registration, cam elements on said register shafts, and related cam members mounted in said frames for cooperation with said cam elements whereby the registers are adapted for operation into and out of engagement with said actuator means; of register engaging and disengaging mechanism including an operating member in common with a pair of said register shafts and adapted to condition said cam elements thereon whereby one of said registers is held in engagement with the said actuator means and another of the registers is held free from engagement therewith, a member having uniform movement in a first part of an operation of the cyclic devices and being restored thereafter in a last part of said operation, control means for said operating member adapted for adjustment to active and inactive positions relative to engagement with the uniform movement member, means manually settable to alternative positions for effecting said adjustment of said control means and to selectively predetermine thereby in a subsequent operation of the cyclic devices a uniform movement of the said operating member, and wherein said movement of said operating member will adjust the said cam elements and thereby shuttle the register shafts to reverse the said condition of the registers with respect to the actuator means.

2. The invention according to claim 1 and wherein the said operating member includes a gear toothed segment, a pair of pinion gears rotatable each with a related one of said register shafts and being in engagement with said gear toothed segment, and wherein said control means for the operating member includes a latch member mounted upon said operating member, manual control means for said latch including a slide manually settable to alternative positions for presetting said latch for engagement or non-engagement with said uniform movement member prior to an operation of the cyclic devices and thereby selectively predetermine operation or non-operation of said gear toothed segment, whereby registrations may be effected alternatively upon either of said registers during a subsequent operation of the cyclic devices.

3. The invention according to claim 2 and having an impulse member adapted for operation by the cyclic devices, and wherein said impulse member in a first cycle of operation of the cyclic devices is adapted to impart a unidirectional movement of operation to the said manually settable slide member and automatically restore said slide from a given register control setting to an alternate register control setting, whereby following a single operation of the machine relative to the said given register subsequent operations performed upon the machine are caused to be directed thereafter to the said alternate register.

4. The invention according to claim 3 and including a two position control lever adapted for manually displacing said slide to either of said alternative positions, a member pivoted upon said impulse member and adapted for engagement with said control lever for restoring said lever and said slide during a first forward movement of said impulse member, and a manual control lever settable for rendering said pivoted member ineffective relative to said restoring operation.

5. The invention in accordance with claim 3 and including a latch member normally conditioned for preventing operation of said impulse means, means operable for releasing said latch during operations of the cyclic devices, means adapted for subsequently delaying operation of said impulse means until a completion of the actuator phase operation of the cyclic devices and for thereafter effecting said impulse operation.

6. The invention as in accordance with claim 5 including a cam means on the said delay means and being adapted to restore the said latch member to its normal latching condition following the said operation of said impulse means.

7. The invention according to claim 1 and including index devices manually operable in the said adjustment of the manually settable means to either of said alternative set positions thereof, means conditioned thereby for subsequently restoring the settable means to an opposite set position, an impulse member adapted for a reciprocatory movement in an operation of the cyclic devices, and wherein said impulse member will effect an automatic operation of the index devices and readjust the said manually settable means from either of the said alternative set positions thereof to the corresponding opposite set position thereof.

8. The invention in accordance with claim 1 and having index devices manually rotatable to a succeeding index position upon the adjustment of the said manually settable means to either of the said alternative set positions thereof, and wherein the said index means includes a cam member conditioned thereby for subsequently restoring said settable means to an opposite set position, impulse means operable in an operation of the cyclic devices and adapted to effect an automatic operation of said index devices, and wherein said cam member during said operation of said index devices will act to restore the said manually settable means from either of said alternative set positions to the opposite set position thereof.

9. The invention in accordance with claim 8 including a reciprocatory movement member operable by the impulse means, a ratchet wheel rotatable with the index devices, a ratchet pawl cooperable with said ratchet wheel and being operable in a return movement of the reciprocatory movement member to effect an operation of the said index devices, and manual control means adapted for setting said ratchet pawl to active or inactive position relative to engagement with said ratchet wheel and thereby selectively predetermine operation or non-operation of said index devices.

10. The invention according to claim 8 and including a first holding means normally conditioned for preventing operation of the impulse means, means operable in an operation of the cyclic devices to release said first holding means from said impulse means, secondary holding means being operable with the cyclic devices and adapted following said release of said first holding means to thereafter delay operation of said impulse means until after a registering phase operation of the cyclic devices is completed, and wherein the secondary holding means immediately following said phase of cyclic operation will effect operation of said impulse means to cause an automatic operation of the said index devices.

11. In a listing calculator, the combination with end support frames having guide slots therein, register means including a pair of transverse shafts mounted each for slidable movement along the related one of said guide slots and having accumulator wheels mounted thereon, actuator means for said wheels, cyclic operating devices, cam elements fast on each of the said register shafts and being adapted for adjustment to move the registers into and out of engaging relation with the actuator means; of mechanism for controlling adjustment of said cams to effect an automatic engaging and disengaging operation of the registers relative to engagement thereof with said actuator means comprising a gear segment, a pair of pinion gears in engagement therewith each having universal joint connection with a related one of said register shafts, and wherein said segment acts to condition the said cam elements for maintaining one register for active engagement and the other register inactive relative to said actuator means, and wherein said segment is operable in a uniform extent of movement to adjust said cam elements and reverse the respective condition of the registers relative to the actuator means; power means movable uniformly in one direction during a first part of an operation of said cyclic devices and returned thereafter in a last part of said operation thereof; clutch means adjustable to alternative positions for connecting or disconnecting said power means with said gear segment, manual control means settable selectively to alternative positions for effecting said adjustment; a slide member having an impulse movement during a machine cycle of operation, and wherein said slide member during a first machine cycle of operation with the said manual control means in a set position related to a given register acts to engage the manual control means and adjust the said clutch means to an alternate control position, and wherein during machine operations thereafter effected said alternate register will remain active for repeated operations therein.

12. The invention according to claim 11 including a ratchet pawl on said impulse slide, a ratchet wheel operable by said pawl, index devices including a cam means rotatable with said ratchet wheel, a member operable in an alternate direction for each successive operation of said cam means, and wherein said member acts to adjust the said clutch means to an alternate control setting for each successive machine operation whereby entries automatically are caused to be effected upon the related alternate of said registers in accordance with the alternate operations of the machine.

13. The invention in accordance with claim 12 and wherein the said manual control means includes a two position lever having connection with the said member operable by the said cam means in said alternate directions, and wherein said lever is adapted for adjustment thereby and will indicate the selective register predetermined for subsequent operation.

14. The invention according to claim 12 and including a manual control lever adapted for adjustment at any time for selectively adjusting said ratchet pawl for engagement or disengagement with the said ratchet wheel to selectively determine operation or non-operation of the register engaging and disengaging mechanism.

15. The invention according to claim 14 and means selectively settable whereby the said impulse slide is determined for active or inactive condition of engagement thereof with the first said manual control means, and wherein an adjustment of the manual control lever for engaging said ratchet pawl with said ratchet wheel is adapted to effect adjustment of the said settable means and render the said impulse slide ineffective of engagement with the first said manual control means.

16. The invention in accordance with claim 15 including manual total and sub-total operations control keys related to totalizing a first of said registers, total and sub-total keys for effecting totalizing operations of said second register, control means operable in an operation of either of said latter totalizing keys to preadjust the clutch means and connect thereby the power means with said gear segment, and wherein a subsequent operation of said segment will cause a shuttle operation to the registers whereby the said second register is conditioned for operation, and wherein during operation thereof said gear segment thereafter effects a second shuttle operation to restore the registers, and wherein said impulse member thereafter acts to restore the said control means and the said clutch means to the first register control position.

17. The invention according to claim 16 and wherein the said totalizing operation key related to the said second register is adapted for operations with respect to either set position of the first named manual control means recited in parent claim 11 and having means operable by the said first named manual control means upon movement thereof to the second register control position for locking the said first register totalizing keys against operation.

18. The invention according to claim 17 and having means adapted for disabling operations of the register engaging and disengaging mechanism during a series of preliminary control cycles of machine operation, including an impulse means adapted in an operation of the cyclic operating devices for effecting a reciprocatory movement to said impulse slide, an index shaft adapted for a partial rotation in each of a plurality of successive machine control cycles of operation, and means operable during a first index operation of said shaft for disabling operation of said impulse slide, and wherein upon a final cycle of said control cycles of operation said disabling means will act to release said impulse slide for effecting a register engaging and disengaging control operation.

19. The invention in accordance with claim 15 including means adapted in an operation of the cyclic operating devices for effecting a reciprocatory movement to said impulse slide, a manual control key for effecting operations of the cyclic operating means and means operable in an operation of said control key for adjusting the said impulse slide to an ineffective position relative to said operation thereof by the said cyclic operating means, whereby successive entries may be made at any time within either of said registers in accordance with the selective setting of said first named manual control means.

20. In a listing calculator, the combination with end support frames having guide slots therein, duplex register devices including a pair of transverse shafts mounted for slidable movement in a related one of said slots and having each a plurality of accumulator wheels mounted for rotation thereon, differentially movable actuators for said accumulator wheels and cyclic operating devices therefor; a rock arm adapted for reciprocatory movement in an operation of the cyclic operating devices, an operating lever having a cam surface cooperable with said rock arm whereby said lever is operated in one direction during a first part of an operation of the cyclic devices, is held inactive during operation of the register actuators and is thereafter returned in a last portion of the operation of the cyclic devices, means normally conditioning one register for engagement with said actuators and the other register out of engagement therewith, a clutch pawl selectively settable for engagement with said operating lever to determine an operation of said register conditioning means, and wherein said operation thereof effects a shuttle operation to reverse the said condition of the registers relative to engagement thereof with said actuators, manual control devices adjustable to an alternate setting for selectively adjusting said pawl for engagement or non-engagement with said operating lever, means for automatically adjusting said manual control devices to an alternate setting in successive operations of the cyclic operating devices, and a manual control means adapted for disabling the said automatic means.

21. The invention according to claim 20 and wherein the said automatic means for adjusting the said manual control devices includes a shaft indexed a step of movement in each operation of the cyclic operating devices, cam means on said shaft having opposed maximum and minimum radius cam surfaces, a lever provided with spaced rollers cooperable with said cam surfaces and having pin and slot connection with said manual control devices, and means operable upon manual operation of the said manual control devices to either alternate position for indexing said cam independently of the said automatic means for operating said manual control devices.

22. The invention according to claim 21 and wherein the said manual means for indexing the said control cam includes a ratchet wheel fast with said index shaft, a first plate loosely mounted upon said shaft and provided with a ratchet pawl engaging said ratchet wheel, a second plate loosely mounted upon said shaft and provided with a ratchet pawl in engagement with said ratchet wheel, a link connecting said manual control devices with said first plate at a point on one side of said index shaft, and a link connecting said manual control devices with said second plate at a point on the opposite side of said shaft to said first link connection.

23. In a listing calculator, the combination with a plurality of amount registers, differentially displaceable actuators for said registers and cyclic drive means therefor; of register engaging and disengaging mechanism including means for holding a register in active relation with said actuators while holding another register out of active relation therewith, an operating member movable with the cyclic drive means, coupling means selectively presettable to couple and uncouple said operating member to the said holding means prior to any movement of said operating member, whereby to selectively predetermine a movement of the said holding means, and wherein said holding means during said movement will effect a shuttle action to each of said registers and reverse thereby the relative conditions thereof with respect to the actuators, control means for said coupling means presettable manually to selective control positions for coupling or uncoupling the said operating member to the said holding means prior to an operation of said cyclic drive means and thereby selectively determine a first active one of the said registers, index devices automatically advanced step by step upon operations of the cyclic drive means during successive machine operations in effecting a series of entries upon the said registers, and wherein said index devices will adjust said coupling means from any instant control position to an alternate control position so as to effect a register shuttle operation and reverse thereby the register settings automatically during each successive operation of the machine.

24. The invention according to claim 23 and including a means for advancing the index devices by the setting movements of the manual control means for the coupling means upon each said presettable operation of the said manual control means to the said selective control positions thereof.

25. The invention according to claim 24 and including a manual control means settable at any time for enabling or disabling said automatic operation of the index devices without disabling the said manual operations for the said index devices.

26. In a listing calculator, the combination with a plurality of amount registers, differentially displaceable actuators for said registers and cyclic drive means therefor; of register engaging and disengaging mechanism including means for holding a register in active relation with said actuators while holding another register out of active relation therewith, an operating member movable with the cyclic drive means, coupling means settable to couple and uncouple said operating member to the said holding means whereby to selectively determine a movement of the said holding means, and wherein said holding means during said movement will effect a shuttle action to each of said registers and reverse thereby the relative conditions thereof with respect to the actuators, whereby during a series of machine operations to control successive entries first upon one register and then upon another register in alternate manner, control means for said coupling means settable to selective control positions for manually coupling or uncoupling the said operating member to the said holding means and thereby selectively determine a first active one of the said registers, index devices advanced step by step upon operations of the cyclic drive means during successive machine operations in effecting a series of entries upon the said registers, and wherein said index devices will adjust said coupling means from any instant control position to an alternate control position so as to effect a register shuttle operation and reverse thereby the register settings automatically during each successive operation of the machine, manual control means for said index devices settable at any time either to enable or disable an operation of the said index devices, and wherein upon disabling of said index devices the coupling means will remain as set in either of the said alternative control positions thereof, whereby selectively to control successive entries in either register, and wherein the register shuttle operation may be continued thereafter by a re-enabling of the said index devices upon an operation of the manual control means at any time.

References Cited in the file of this patent

UNITED STATES PATENTS

| | | |
|---|---|---|
| 1,817,451 | Gubelmann | Aug. 4, 1931 |
| 1,867,002 | Gardner | July 12, 1932 |
| 1,929,625 | Crosman | Oct. 10, 1933 |
| 2,645,417 | Fleming | July 14, 1953 |